July 21, 1959 T. R. BOYD 2,895,524
TWISTED TOOTH LOCK WASHER HAVING ANTI-SKID BODY SECTION
Filed Sept. 26, 1956
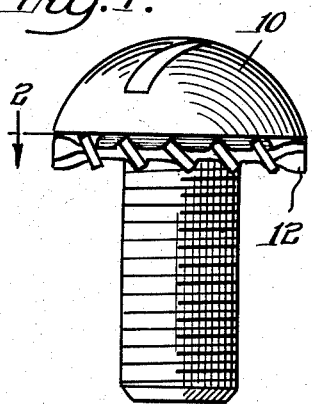
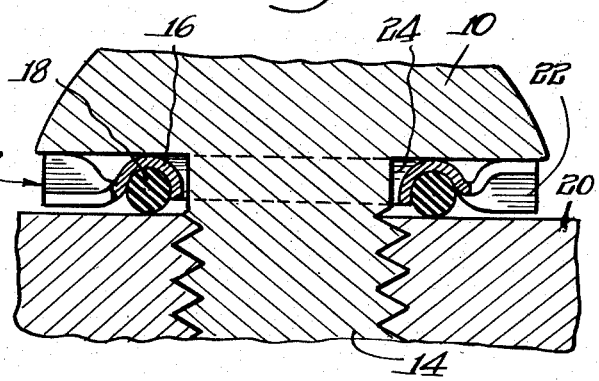
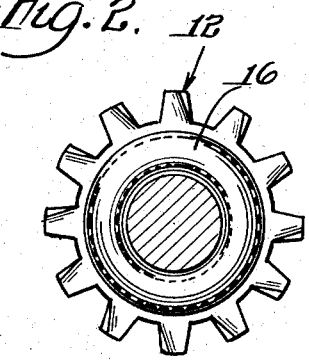
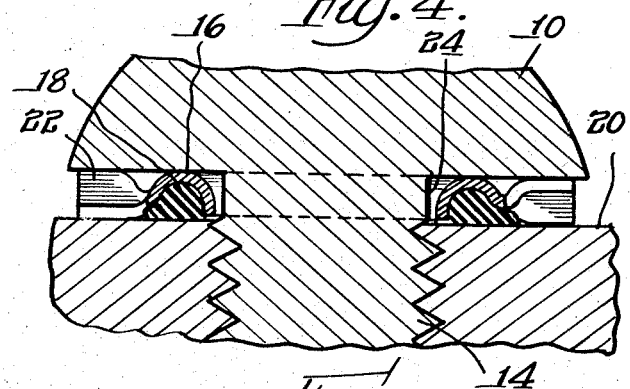
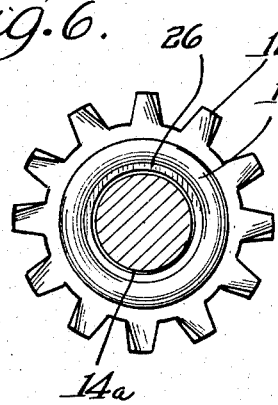
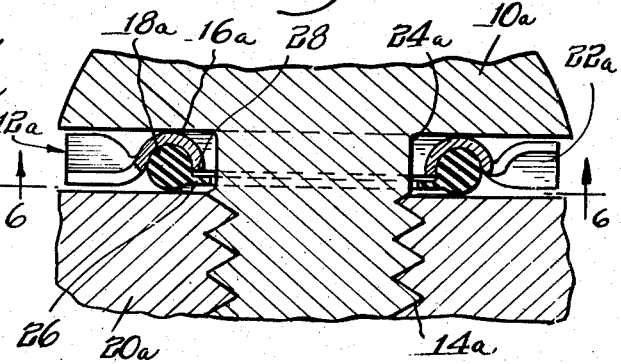
INVENTOR.
Thomas R. Boyd
BY
Olson & Trexler
attys.

United States Patent Office 2,895,524
Patented July 21, 1959

2,895,524

TWISTED TOOTH LOCK WASHER HAVING ANTI-SKID BODY SECTION

Thomas R. Boyd, Park Ridge, Ill., assignor to Illinois Tool Works, Chicago, Ill., a corporation of Illinois Application September 26, 1956, Serial No. 612,133

7 Claims. (Cl. 151—37)

This invention is concerned with the fastening art, and specifically with an improved lock washer.

Twisted tooth lock washers are well known in the art. They may be used as loose washers for association with work parts as the parts are assembled, or they may be preassembled with threaded fasteners such as screws or nuts. It will be appreciated that in many instances it is desirable that the lock washer not rotate as it is being installed, and that is particularly true when the lock washer is associated with soft metals or finished surfaces, since the hardened teeth would tend to mill the surfaces.

Accordingly, it is an object of this invention to provide an improved lock washer which is automatically held against rotation during installation.

A further object of this invention is to provide a lock washer having a non-skid section adapted to engage a workpiece to prevent rotation of the lock washer as it is installed.

A more specific object of this invention is to provide an improved lock washer having a non-skid section or sections, preferably of rubber or the like material, and preferably in the form of a continuous ring for engagement with a work part to prevent rotation of the washer during association of the washer with the work part.

Other and further objects and advantages of the present invention will be apparent from the following description when taken in connection with the accompanying drawings wherein:

Fig. 1 is a side view of a washer constructed in accordance with the principles of the invention and assembled with a screw;

Fig. 2 is a horizontal view partly in section as taken substantially along the line 2—2 in Fig. 1;

Fig. 3 is a longitudinal sectional view through the washer and screw during installation thereof;

Fig. 4 is a view similar to Fig. 3 showing the parts after complete installation;

Fig. 5 is a longitudinal sectional view similar to Fig. 3, showing a modified form of the invention; and Fig. 6 is a horizontal sectional view looking up from beneath the washer as taken substantially along the line 6—6 in Fig. 5.

Referring now in greater particularity to the drawings, there will be seen a screw or bolt 10 having a lock washer 12 thereon. Preferably, the lock washer is assembled with a bolt blank, and the threads are thereafter rolled on the shank 14 of the blank whereby permanently to trap the washer 12 on the shank of the bolt 10 beneath the head thereof, in the well known "Sems" type of unit.

The lock washer 12 includes a circular or ring-like body portion 16 of substantially semi-toroidal form. The body 16 opens downwardly, and has a cross section which actually is slightly greater than a semi-circle whereby to grip an anti-skid ring 18 of rubber or the like. This ring projects below the body 16 in order to engage a workpiece 20 during association of the washer with the workpiece. The washer further is provided with radially extending, twisted locking teeth 22 of well known type. It will be seen that the rubber ring 18 extends below the lower edges of the teeth 22, and accordingly the rubber ring alone engages the workpiece 20 when the washer first approaches the workpiece. As a result, the washer is frictionally held against rotation, and the edges of the twisted teeth 22, which are heat treated and hardened, do not mill or otherwise mark the surface of the workpiece 20 due to relative rotation.

The upper portion of the shank 14 is threadless as at 24 immediately beneath the head of the bolt in order to provide clearance for the body 16. The body 16 is of substantial height, although less than the height of the twisted teeth, and it will be seen in Fig. 4 that when the bolt is turned all the way in, and the rubber ring 18 is deformed, the body 16 prevents complete collapse of the teeth 22. As will be understood, if the teeth were completely flattened or collapsed they would not properly engage the surface of the workpiece and the underside of the head of the bolt, and accordingly would not exert the most efficient locking action. Accordingly, the body 16 serves both to secure the anti-skid ring 18, and to preclude complete collapse of the twisted teeth.

As previously has been indicated, the body 16 has a cross section slightly greater than a semi-circle, whereby the rubber ring is retained in the body as an operative part of the washer. It will be understood that the ring also could be bonded to the washer body, as by a suitable adhesive, and that in this instance the body of the washer could have a cross section somewhat less than a semi-circle.

A modification of the invention is shown in Figs. 5 and 6. In this modification, the parts are generally similar to those previously described, and are identified by similar numerals with the addition of the suffix *a*. The washer 12*a* includes the semi-toroidal body section 16*a* and the twisted locking teeth 22*a*, with the rubber ring or the like 18*a* mounted in the body section. The difference in this instance is that the internal diameter of the washer body section 16*a* is sufficiently large for the washer to fit over the threads formed on the bolt shank 14*a*. However, the ring 18*a* is provided with a radially inwardly extending circular flange or lip 26 which underlies the lower edge 28 of the body 16*a*, and has a sufficiently small internal diameter as to engage the shank 14*a* above the top of the threads thereon, in the section 24*a*. This causes the flange or lip 26 to retain the washer on the bolt to form a novel "Sems" 'assembly.

In both forms of the invention as herein shown and described, it will be apparent that the ring of rubber or the like forming a part of the washer serves as an anti-skid element preventing rotation of the washer during association thereof with a work part. Accordingly, the work part does not have the surface thereof milled or otherwise marked by the teeth 22 of the washer due to relative rotation. In addition, the vertical height of the body of the washer holding the rubber ring is such that, coupled with the substantial rigidity of the body due to tis semi-toroidal shape, complete collapse of the locking teeth is prevented, and efficient locking action is obtained at all times. In the first form of the invention the washer may or may not be preassembled with a bolt, and in the second form of the invention the integral fin, flange, or lip on the rubber or the like ring secures the washer on the bolt to form a novel "Sems" unit. It will be apparent that the lower edge of the body reinforces the rubber fin when the fin tends to flex upwardly, whereby the fin positively secures the washer on the bolt. However, the fin is not so reinforced in the opposite direction, and it therefore will be apparent that the washer can be slipped over a finished bolt having threads thereon, and will not thereafter slip from the bolt. Of course, the washer can be preassembled with a bolt blank, and the threads can be rolled thereafter.

The particular embodiments of the invention as shown and described herein are set forth for illustrative purposes only. Various changes in structure will no doubt occur to those skilled in the art, and will be understood as forming a part of the invention insofar as they fall within the spirit and scope of the appended claims.

The invention is claimed as follows:

1. A lock washer having a substantially semi-toroidal body section opening axially in one direction, twisted locking teeth extending radially from said body section and extending axially in both directions beyond said semi-toroidal body section for engagement with a clamping surface of a rotary threaded fastener and with the surface of a workpiece, and a ring of resilient, anti-skid rubber-like material radially substantially coextensive with and received in said substantially semi-toroidal body section and having a body section in part semitoroidal and complementary to said washer-body section, said ring extending axially beyond said twisted locking teeth in the direction which said body section opens whereby to engage a workpiece and prevent rotation of said washer relative to said workpiece during installation, and thereby preventing marking of said workpiece by said locking teeth due to relative rotation, said insert resiliently yielding to allow the locking teeth to engage the workpiece, and said semi-toroidal body section preventing complete collapse of said locking teeth.

2. A lock washer as set forth in claim 1 wherein the substantially semi-toroidal body section has a cross section greater than a semi-circle, whereby grippingly to hold said ring.

3. A lock washer as set forth in claim 1 wherein the ring is bonded to said body section.

4. A lock washer having a substantially semi-toroidal body section opening axially in one direction, a plurality of circumferentially disposed, twisted locking teeth extending radially outwardly from said body section and extending axially beyond said body for engagement with a clamping surface of a rotary threaded fastener and with the surface of a workpiece, and an anti-skid ring of rubber-like material secured within said body terminating radially short of said twisted locking teeth and extending axially in the direction in which said body opens beyond said locking teeth to engage a workpiece and prevent rotation of said washer relative to said workpiece during installation, and thereby preventing marking of said workpiece by said locking teeth due to relative rotation, an internal circumferential fin on said ring extending radially inwardly beyond said body section for cooperation with the shang of a fastener, said body section backing up said fin in the direction opposite to that in which the body section opens, and said body section preventing complete collapse of said twisted locking teeth.

5. A fastener unit comprising a bolt having a head and a shank with threads thereon, the threads being terminated short of the head, and a lock washer mounted on the bolt shank between the threads and the bolt head and comprising a substantially semi-toroidal body section opening axially away from the bolt head, a plurality of circumferentially spaced twisted locking teeth extending radially from said body section and extending axially on opposite sides of said body section for engaging the under surface of the bolt head and for engaging the surface of a workpiece, and a rubber-like ring radially substantially coextensive with and mounted in said body section and extending axially away from the bolt head beyond the locking teeth whereby to engage a workpiece and prevent rotation of said washer relative to said workpiece during installation of said bolt and washer, and thereby preventing marking of said workpiece by said locking teeth due to relative rotation, said washer having an internal diameter less than the maximum diameter of the threads on the bolt shank whereby the washer is permanently retained on the bolt shank.

6. A fastener unit as set forth in claim 5 wherein the body of the lock washer has a smaller internal diameter than the maximum diameter of the bolt threads.

7. A lock washer as set forth in claim 5 wherein the inner diameter of the washer body is greater than the maximum diameter of the bolt threads, and wherein the ring has an internal circumferential flange extending radially inwardly beyond the washer body section and has an inner diameter less than the maximum diameter of the bolt threads.

References Cited in the file of this patent

UNITED STATES PATENTS

| | | |
|---|---|---|
| 1,208,620 | Moser | Dec. 12, 1916 |
| 1,824,991 | Gribbie | Sept. 29, 1931 |
| 1,874,462 | Crowther | Aug. 30, 1932 |
| 2,236,235 | Head | Mar. 25, 1941 |
| 2,396,005 | Gross et al. | Mar. 5, 1946 |
| 2,713,883 | Poupitch | July 26, 1955 |
| 2,761,347 | McKee | Sept. 4, 1956 |

FOREIGN PATENTS

| | | |
|---|---|---|
| 121,574 | Australia | June 7, 1946 |
| 1,009,296 | France | Mar. 5, 1952 |